(12) United States Patent
Pflanz et al.

(10) Patent No.: US 11,877,982 B2
(45) Date of Patent: Jan. 23, 2024

(54) MEDIA FILTRATION DEVICE

(71) Applicant: Sartorius Stedim Biotech GmbH, Goettingen (DE)

(72) Inventors: Karl Pflanz, Gleichen (DE); Holger Linne, Goettingen (DE); Andreas Graus, Noerten-Hardenberg (DE); Stefan Schlack, Goettingen (DE)

(73) Assignee: SARTORIUS STEDIM BIOTECH GMBH, Goettingen (DE)

( * ) Notice: Subject to any disclaimer, the term of this patent is extended or adjusted under 35 U.S.C. 154(b) by 804 days.

(21) Appl. No.: 16/993,929

(22) Filed: Aug. 14, 2020

(65) Prior Publication Data
US 2020/0368109 A1   Nov. 26, 2020

Related U.S. Application Data

(63) Continuation of application No. PCT/EP2019/053324, filed on Feb. 11, 2019.

(30) Foreign Application Priority Data

Feb. 19, 2018   (DE) .................. 10 2018 103 634.5

(51) Int. Cl.
*A61J 1/20*   (2006.01)
*A61J 1/14*   (2023.01)
(Continued)

(52) U.S. Cl.
CPC ........... *A61J 1/2086* (2015.05); *A61J 1/1475* (2013.01); *A61J 1/2075* (2015.05); *A61J 1/2089* (2013.01);
(Continued)

(58) Field of Classification Search
CPC ...... A61J 1/2086; A61J 1/1475; A61J 1/1481; A61J 1/1487; A61J 1/2089; B01D 29/03; B01D 39/14; B01F 23/565; B01F 2101/22
See application file for complete search history.

(56) References Cited

U.S. PATENT DOCUMENTS 3,592,245 A   7/1971 Levi et al.
4,113,627 A   9/1978 Eason
(Continued)

FOREIGN PATENT DOCUMENTS

DE   4219966 A1   1/1993
DE   102011016767 A1   10/2012
(Continued)

OTHER PUBLICATIONS

International Search Report, PCT/EP2019/053324, dated May 17, 2019, 5 pages.
(Continued)

*Primary Examiner* — Timothy C Cleveland
(74) *Attorney, Agent, or Firm* — Edell, Shapiro & Finnan, LLC

(57) ABSTRACT

A device (1) and method for media filtration with a preparation container (2). A chamber (5) containing a dissolvable medium (29) is situated between the container inflow and outflow, and has a filter (22). A mixing arm (6, 7), connected to the inflow, protrudes into the medium in the chamber with at least one mixing nozzle (19, 20), disposed at the free end (17, 18) of the mixing arm for generating a directed jet of solvent. The preparation container has bottom (10) and top (8) parts bracketing the chamber. The filter is a sterile, has on the filtrate side facing the outflow, a circumferential outer edge (23) resting on a circumferential rest edge (37) of the bottom part of the preparation container and is connected fixedly thereto. A sterilised filtrate space (39) is formed between the filtrate side (38) of the filter and the outflow situated in the bottom part.

19 Claims, 6 Drawing Sheets

(51) Int. Cl.
*B01D 29/03* (2006.01)
*B01D 39/14* (2006.01)
*B01F 23/50* (2022.01)
*B01F 35/00* (2022.01)
*B01F 101/22* (2022.01)

(52) U.S. Cl.
CPC ............ *B01D 29/03* (2013.01); *B01D 39/14* (2013.01); *B01F 23/59* (2022.01); *B01F 35/187* (2022.01); *B01D 2239/0428* (2013.01); *B01F 23/565* (2022.01); *B01F 2101/22* (2022.01); *B01F 2215/0422* (2013.01)

(56) References Cited

U.S. PATENT DOCUMENTS

| | | |
|---|---|---|
| 4,475,914 A | 10/1984 | Portnoff |
| 2003/0029763 A1 | 2/2003 | Reif et al. |
| 2010/0297299 A1 | 11/2010 | Epars et al. |
| 2012/0015080 A1 | 1/2012 | Roulin et al. |
| 2014/0041752 A1 | 2/2014 | Jornitz et al. |
| 2018/0346239 A1 | 12/2018 | Heydel |
| 2019/0022614 A1 | 1/2019 | Krumbein et al. |

FOREIGN PATENT DOCUMENTS

| | | |
|---|---|---|
| DE | 102011112291 A1 | 3/2013 |
| DE | 102015114766 A1 | 3/2017 |
| EP | 2236437 B1 | 3/2012 |
| EP | 2244743 B1 | 7/2016 |
| WO | 2016126891 A1 | 8/2016 |
| WO | 2017050745 A1 | 3/2017 |

OTHER PUBLICATIONS

Shrestha, Aabhash, "Characterization of Porous Membranes via Porometry", Mechanical Engineering Graduate Theses & Dissertations, 2012, 103 pages.

MEDIA FILTRATION DEVICE

CROSS REFERENCE TO RELATED APPLICATIONS

This is a Continuation of International Application PCT/EP2019/053324 which has an international filing date of Feb. 11, 2019, and the disclosure of which is incorporated in its entirety into the present Continuation by reference. This Continuation also claims foreign priority under 35 U.S.C. § 119(a)-(d) to and also incorporates by reference, in its entirety, German Patent Application DE 10 2018 103 634.5 filed on Feb. 19, 2018.

FIELD OF THE INVENTION

The invention relates to a media filtration apparatus having prefabricated preparation container which has an inflow for a solvent and has an outflow for a solution, wherein a preparation chamber with a medium to be dissolved is arranged between the inflow and the outflow, wherein the preparation container has a filter, and wherein at least one mixing arm, which is connected to the inflow, projects with at least one mixing nozzle, which is arranged at the free end of the at least one mixing arm and serves for generating a directed solvent jet, into the medium to be dissolved in the preparation chamber, wherein the preparation container has a base part and a cover part, between which the preparation chamber is arranged.

The invention also relates to a method for media filtration using such a media filtration apparatus.

BACKGROUND

In the pharmaceutical and biopharmaceutical sector, in particular in the preclinical or clinical sector, and also in research and development, it is often necessary to prepare small volumes of buffers and media. The buffers and media are often prefabricated according to predetermined formulations, this requiring careful and relatively time-consuming handling by specialist personnel. Of particular importance here is the preparation of substance mixtures which are matched to the volumes, concentrations and components or media required by the end consumer.

If liquid, that is to say solvent, is fed only as required, the storage containers can be relatively small in volume and are thus able to be transported and stored more easily. Moreover, storage and transport are further facilitated since generally, owing to dry storage, no cooling is required.

EP 2 236 437 B1 discloses a media filtration apparatus having an already prefabricated preparation container which has an inflow for a solvent and has an outflow for a solution. In this case, a preparation chamber with a medium to be dissolved is arranged between the inflow and the outflow, with the preparation container having a filter. A mixing arm, which is connected to the inflow, projects with a mixing nozzle, which is arranged at the free end of the mixing arm, into the preparation chamber.

A disadvantage with the known media filtration apparatus is that a prechamber, which is subdivided by the filter, which may be an antimicrobial filter, is arranged between the inflow and the preparation chamber. Firstly, this is relatively complex and thus cost-intensive, and secondly, the filter is arranged adjacent to the inflow and not adjacent to the outflow. This is disadvantageous in particular in the pharmaceutical and biopharmaceutical sectors since the sterility of the filtrate chamber, which is arranged upstream of the outflow, is not ensured.

Furthermore, EP 2 244 743 B1 discloses a media filtration apparatus having prefabricated preparation container which has an inflow side into which an inflow for a solvent is produced via an insertable cannula and which has an outflow for a solution. Here too, a preparation chamber with a medium to be dissolved is arranged between the inflow and the outflow. The solvent is thereby fed via the cannula inserted into the preparation chamber. The preparation chamber has a filter toward the outflow, which is preferably spaced apart from the outlet side.

A disadvantage here is that this capsule construction for food cannot be adopted for the use of cell media. With cell media, it is of importance in particular that the medium is provided in a sterile state. However, sterilization of the cell media is normally not possible since, during the sterilization process, these cell media are destroyed or at least damaged, that is to say the unit cannot be sterilized in its entirety.

A capsule for producing a beverage is known from WO 2017/050 745 A1. The beverage capsule comprises a cup-shaped body which forms a cavity and which is closed off by a cover through which a liquid can be injected into the cavity of the capsule. A separating wall subdivides the interior of the beverage capsule into a relatively small prechamber, which is arranged below the cover, and a relatively large main chamber, which is arranged below the prechamber and in which the individual portion quantity of a beverage component is situated. Situated in the separating wall is a channel which projects into the main chamber and, in this way, connects the two chambers to one another and permits the throughflow of the injected liquid from the prechamber into the main chamber.

U.S. Pat. No. 3,592,245 A discloses a medicament container for producing a medicament solution from at least two components in a container under sterile conditions. One component of the medicament solution has been placed in the bottle-like container. The container is provided with a closure which, inwardly, has a cavity and which is adjoined by a hollow piercing apparatus which selectively projects into the container or faces in the other direction, that is to say away from the container. A filter is arranged between the cavity of the closure and the cavity of the piercing apparatus.

U.S. Pat. No. 4,475,914 A discloses a medicament container for producing a medicament solution from a solid component of rather low solubility and a liquid, which is connected to a hollow piercing apparatus. The piercing apparatus comprises two channels, which may optionally be vented by way of a valve which is provided with a sterile filter.

US 2003/0 029 763 A1 discloses a package for a sterile disposable syringe filter, which permits the connection of the syringe filter to a syringe without the syringe having to be put down for the purpose of opening the filter package. In that case, the filter package has a penetration point where the connection of the filter for the syringe is situated. Furthermore, the filter package is provided with preformed tear lines along which the package can be torn open, which allows simple removal of the syringe filter connected to the syringe.

DE 10 2011 112 291 A1 discloses an apparatus for filtration of a liquid sample, which has a pressurizable sample container for receiving the liquid sample and has a filter attachment, with filter included, which is able to be connected to a connection of the sample container. The sample container contains a filtration aid suitable for precoat filtration. Moreover, the filter attachment has a dead space which is arranged upstream of its filter and which serves for receiving a filter cake that is being formed.

SUMMARY

It is an object of the present invention to improve the known media filtration apparatuses such that, in the context of an inexpensive design of the media filtration apparatuses, sterility of the filtrate in a filtrate space can be ensured, even though the medium to be dissolved, for example a cell medium, is not able to be sterilized, i.e., would be destroyed or at least damaged during a sterilization process.

A further object of the present invention is to specify a method for media filtration using a thus improved media filtration apparatus, in which sterility of the filtrate in a filtrate space can be ensured, even though the medium to be dissolved, for example a cell medium, is not able to be sterilized, i.e., would be destroyed or at least damaged during a sterilization process.

According to one formulation, the object with regard to the media filtration apparatus is achieved by providing a media filtration apparatus having a prefabricated preparation container in which a filter is formed as a sterile filter, the filter has on its filtrate side, which faces the outflow, an encircling outer boundary, with which the filter bears on an encircling support boundary of a base part of the preparation container and is connected fixedly thereto, and in which a sterilized filtrate space is formed between the filtrate side of the filter and the outflow, which is arranged in the base part.

The mixing arm, connected to the inflow, and the mixing nozzle, arranged at the free end of the mixing arm, in the preparation chamber make it possible for the medium to be dissolved to be mixed with the solvent. The term 'mixing arm' is to be understood as meaning a fixed feed with a feed channel connected to the feed, the free end of which ends in the preparation chamber and has a mixing nozzle via which a directed solvent jet is fed to the preparation chamber.

The design of the filter as a sterile filter ensures that the filtered solution is sterile. The encircling outer boundary on the filtrate side of the filter, by way of which the filter is fixedly connected on an encircling support boundary of the base part, makes possible separate sterilization of the base part with filter and filtrate space. As will be evident to those skilled in the art, for ensuring the sterility of the filtrate space, this space has to be sealed to the outside, that is to say is not open, as is illustrated in the figures. This may be realized for example via a cover, a connected sterile connector or a seal (peel-off membrane/film).

It is thus possible for sterilization of the medium to be dispensed with and sterility of the solution, that is to say the filtrate, to nevertheless be ensured. The medium to be dissolved is arranged in the preparation chamber on the non-filtrate side of the filter. The design of the filter as a sterile filter allows the sterility of the solution of the dissolved filtered medium to be ensured in a relatively simple and inexpensive manner. With the media filtration apparatus according to this formulation of the invention, the high requirements of bioprocess technology, in particular with regard to sterility aspects and security against undesired leakage of substances, which are of particular importance in this area, can be met.

Preferred embodiments are the subject matter of dependent claims, as set forth below.

According to a preferred embodiment of the invention, agitation granules which are not able to be dissolved by the solvent are arranged in the preparation chamber.

By way of the agitation granules arranged in the preparation chamber, which are not able to be dissolved by the solvent, the solvent exiting the mixing nozzle is swirled together with the medium to be dissolved and blockage of the filter is reliably prevented. While the medium is dissolved in the fed solvent and discharged as a filtered solution via the outflow, the agitation granules remain in the preparation chamber.

According to a further preferred embodiment of the invention, the mixing nozzle is arranged in the preparation chamber such that it generates a directed solvent jet which moves the medium to be dissolved in a circular flow over the filter. Here, a turbulent flow leads to quick and thorough mixing and shortens the dissolution time.

According to a further preferred embodiment of the invention, the base part has a channel system which conducts to the outflow and which is open toward the filtrate side of the filter.

By way of the channel system, which is open toward the filtrate side of the filter and opens into the outflow, the filtrate is discharged relatively uniformly over the entire filter surface, which can consequently be used accordingly.

According to a preferred embodiment of the invention, the preparation container has a venting apparatus, whose at least one venting opening is covered by a hydrophobic filter.

For generating an exact concentration of the solution to be produced, it is of particular importance to maintain not only the provision of an exact quantity of dry medium but also exact volumetric dosing. The venting apparatus results in a technically simplified solution which avoids a dosing or valve device arranged downstream of the media filtration unit. With the venting apparatus, it can be reliably ruled out that compressed air cushions by the addition of solvent into the media filtration apparatus are formed. These air cushions would lead to a follow-on flow, and thus incorrect liquid dosing, after the feeding of solvent is stopped. By avoiding this dosing or valve device, these drawbacks can be reliably ruled out. The hydrophobic filter, moreover, reliably prevents solvent or reconstituted media from being able to escape via the venting apparatus.

According to a preferred embodiment of the invention, the inflow is arranged on a cover part of the preparation container. Also, the cover part may have the above-described venting apparatus, via which the air displaced by the solvent can escape. Here, the venting apparatus has the at least one venting opening, which is covered by the hydrophobic filter on the inner surface, facing the preparation chamber, of the cover part.

According to a preferred embodiment, the cover part has an open channel system, via which air to be discharged from the preparation chamber is conducted to the hydrophobic filter.

According to a further preferred embodiment of the invention, the filter, in the form of a sterile filter, is of multi-ply form. Preferably here, at least one ply of the filter is a porous membrane. Alternatively, it is also possible for a multi-ply nonwoven to be used. Other layers known to a person skilled in the art that have filtering properties are also feasible.

Sterile filters preferably have average pore sizes in the range of 0.1-8 μm. Average pore sizes are determined for example by the following method for determining the average pore size.

Capillary flow porosimetry is used. Capillary flow porosimetry is gas/liquid porosimetry in which the differential gas pressures and flow rates through a membrane sample are measured firstly in the moist state and then in the dry state.

Prior to the measurement, the membrane sample is brought into contact with wetting liquid such that all the available pores are filled with this liquid. After the filling of the pores and the introduction of the sample, the measurement cell is to be closed and the measurement is to be started. After the measurement is started, the gas pressure is increased automatically and in steps, and the gas pressure empties the pores of diameter corresponding to the prevailing pressure. This is carried out until the relevant pore range has been covered, that is to say until even the smallest pores present in the measurement range have been freed of liquid. Subsequently, the pressure is lowered again and the measurement is automatically repeated at the then dry sample. The pore size distribution is calculated from the difference between the two pressure-flow rate curves via the Young-Laplace equation (see Shrestha, Aabhash, "Characterization of porous membranes via porometry" (2012), Mechanical Engineering Graduate Theses & Dissertations, Paper 38).

According to a preferred embodiment of the invention, two mixing arms, which are connected to the inflow and have in each case at least one mixing nozzle arranged at their free ends, are arranged in the preparation chamber. Here, the mixing nozzle or the mixing nozzles are advantageously arranged eccentrically with respect to a longitudinal axis of the preparation container. The eccentric arrangement of the mixing nozzles leads to better swirling and thus to quicker mixing of the solvent with the medium to be dissolved and, accordingly, to quicker dissolution of the medium. It is basically also possible, however, for three or more mixing arms connected to the inflow and having in each case at least one mixing nozzle arranged at their free ends to be arranged in the preparation chamber.

According to a further preferred embodiment of the invention, the inflow projects into the preparation chamber centrally with respect to the longitudinal axis of the preparation container and transitions into the, for example two, mixing arms, which, with their mixing arm axis, are each spread away by a spreading angle of between 15° and 90°, for example 60°, in relation to the longitudinal axis. Preferably here, the two mixing arms span a vertical plane with respect to which the mixing nozzles are oriented orthogonally and in mutually opposite spraying directions. This ensures a turbulent flow of the solvent with the medium to be dissolved and the agitation granules and temporal shortening of the mixing process.

The medium to be dissolved may be a powder or granules. Also, the medium to be dissolved may contain additives.

According to a further formulation, the object with regard to the method for media filtration using such a media filtration apparatus is achieved in that the inflow of the media filtration apparatus is connected to a storage container from which the solvent is fed to the preparation container via a regulating valve which is controlled by a control unit, and in that the outflow of the media filtration apparatus is connected to a receiving container to which the filtered solution is fed.

In a preferred refinement of the method, for prefabrication of the preparation container, the following steps are carried out:
 a) providing the cover part and the base part with the sterilized filtrate space,
 b) introducing the medium to be dissolved into the preparation chamber, and
 c) joining together the cover part and the base part.

The fact that the base part with outflow, filter and filtrate space forms a sterilizable unit which is sterilized without a cover part and without a medium to be dissolved means that a sterilized, that is to say sterile, filtrate space can be formed without any problems. The base part may be delivered separately packed or plugged together with the cover part for prefabrication. The medium to be dissolved is introduced into the preparation chamber, which is open on one side, and then the cover part and the base part are joined together. The joining-together may be realized for example by adhesive bonding or by laser welding or by ultrasound welding.

In step b), the agitation granules, which are not able to be dissolved by the solvent, may be additionally introduced.

The prefabricated media filtration apparatus may be packed, and stored and transported without any problems.

Further features and advantages of the invention will emerge from the following specific description and the drawings.

DETAILED DESCRIPTION

Figure 1:
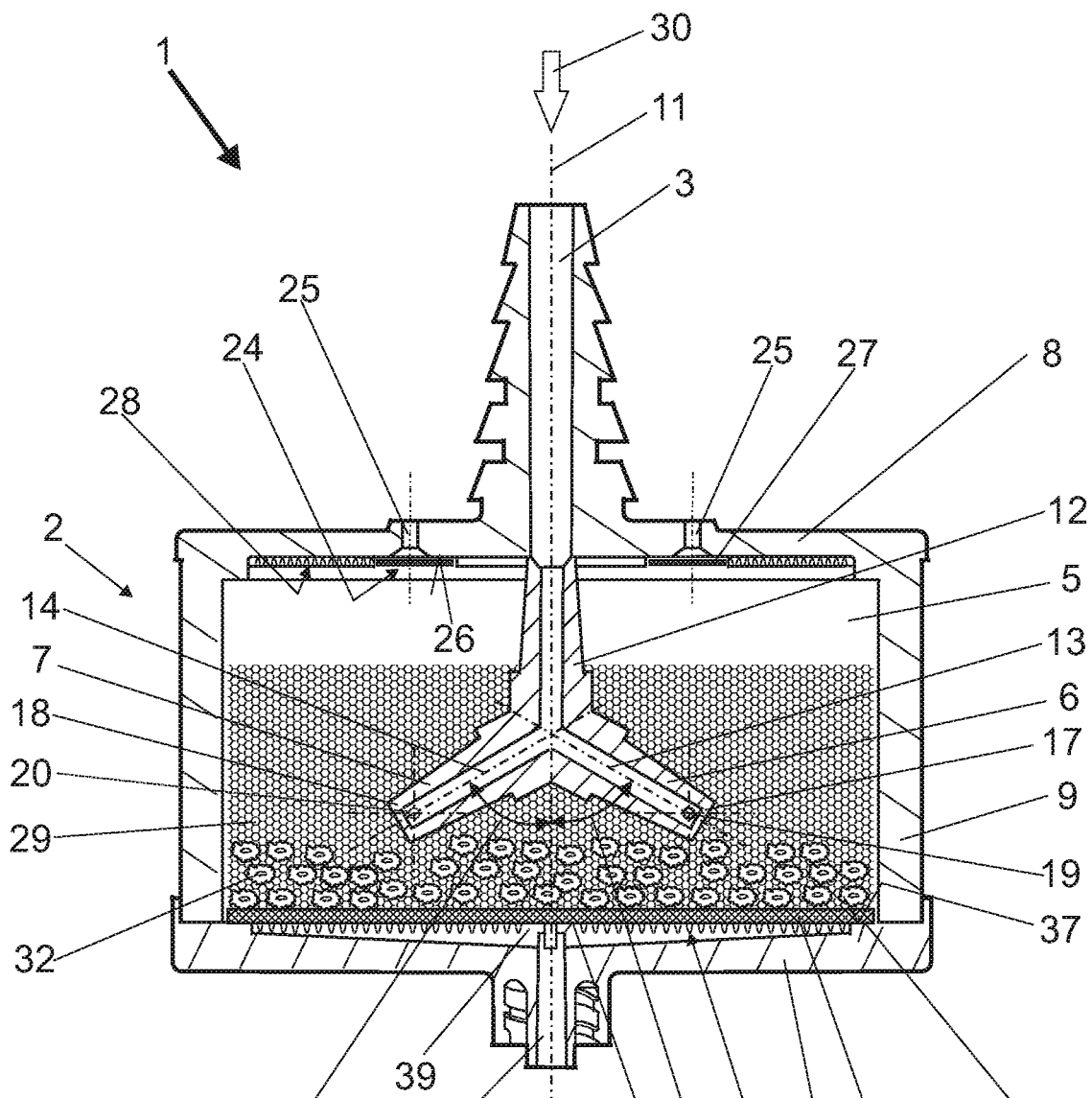
FIG. 1 shows a sectional side view of a media filtration apparatus according to a first exemplary embodiment.

A media filtration apparatus 1 consists substantially of a preparation container 2, an inflow 3, an outflow 4, a preparation chamber 5 and two mixing arms 6, 7.

Figure 2:
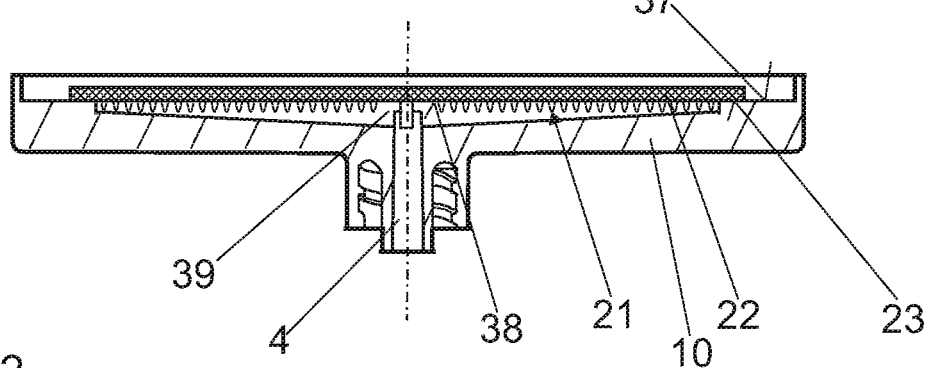
FIG. 2 shows the base part in FIG. 1 with filter and sterilized filtrate space.
Figure 3:
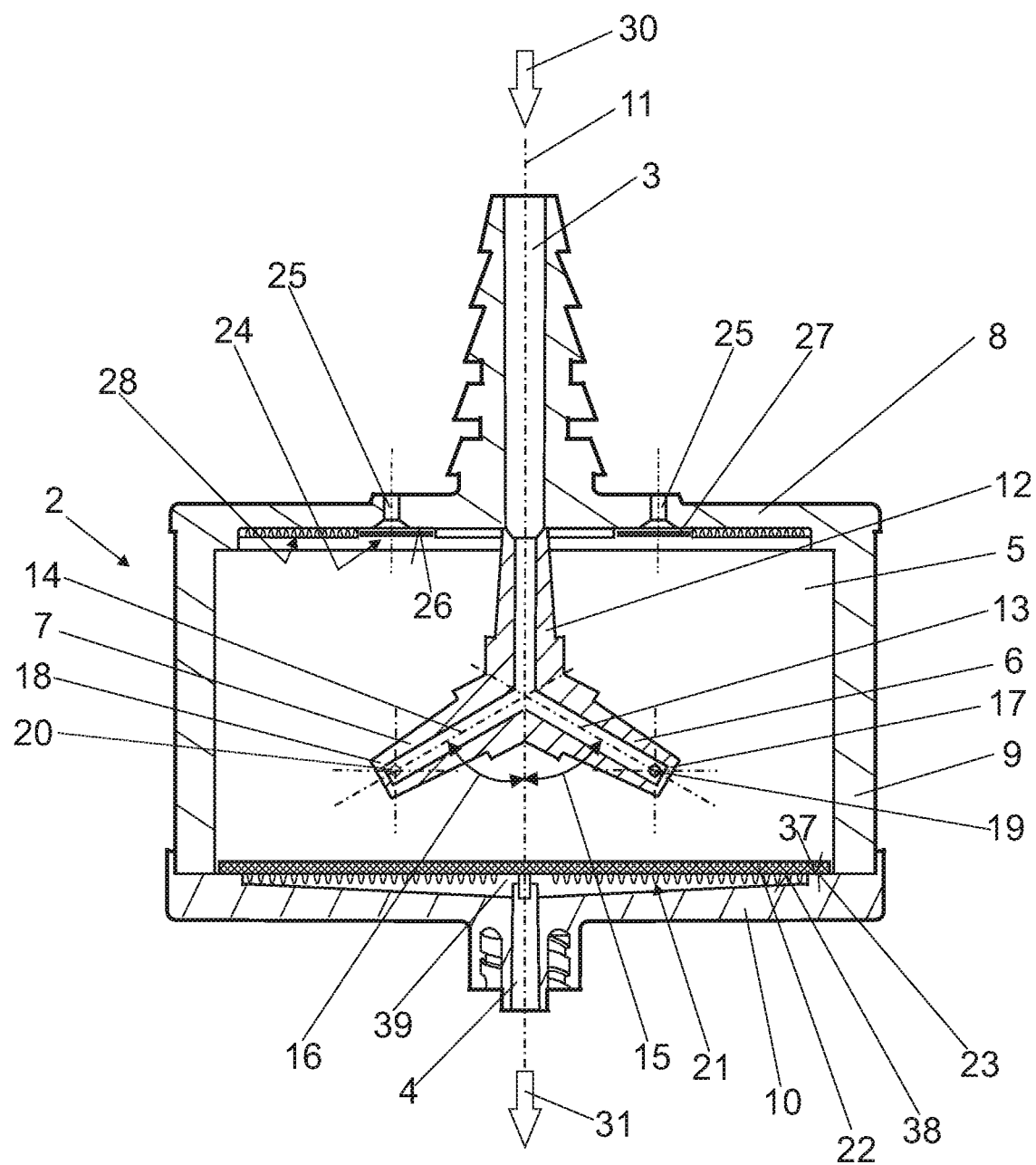
FIG. 3 shows the base part with sterilized filtrate space and mounted cover part in FIG. 1, still without medium and without granules.

The preparation container 2 consists of a cover part 8, which has the inflow 3, this inflow being in the form of a tube connection part in the exemplary embodiment in FIGS. 1 to 4. Formed integrally on the cover part 8 according to FIGS. 1 to 3 is an annular container wall 9. The container wall 9 is, at its lower end in the vertical direction, connected to a base part 10, which has the outflow 4. The cover part 8, the container wall 9 and the base part 10 border the preparation chamber 5.

Figure 4:
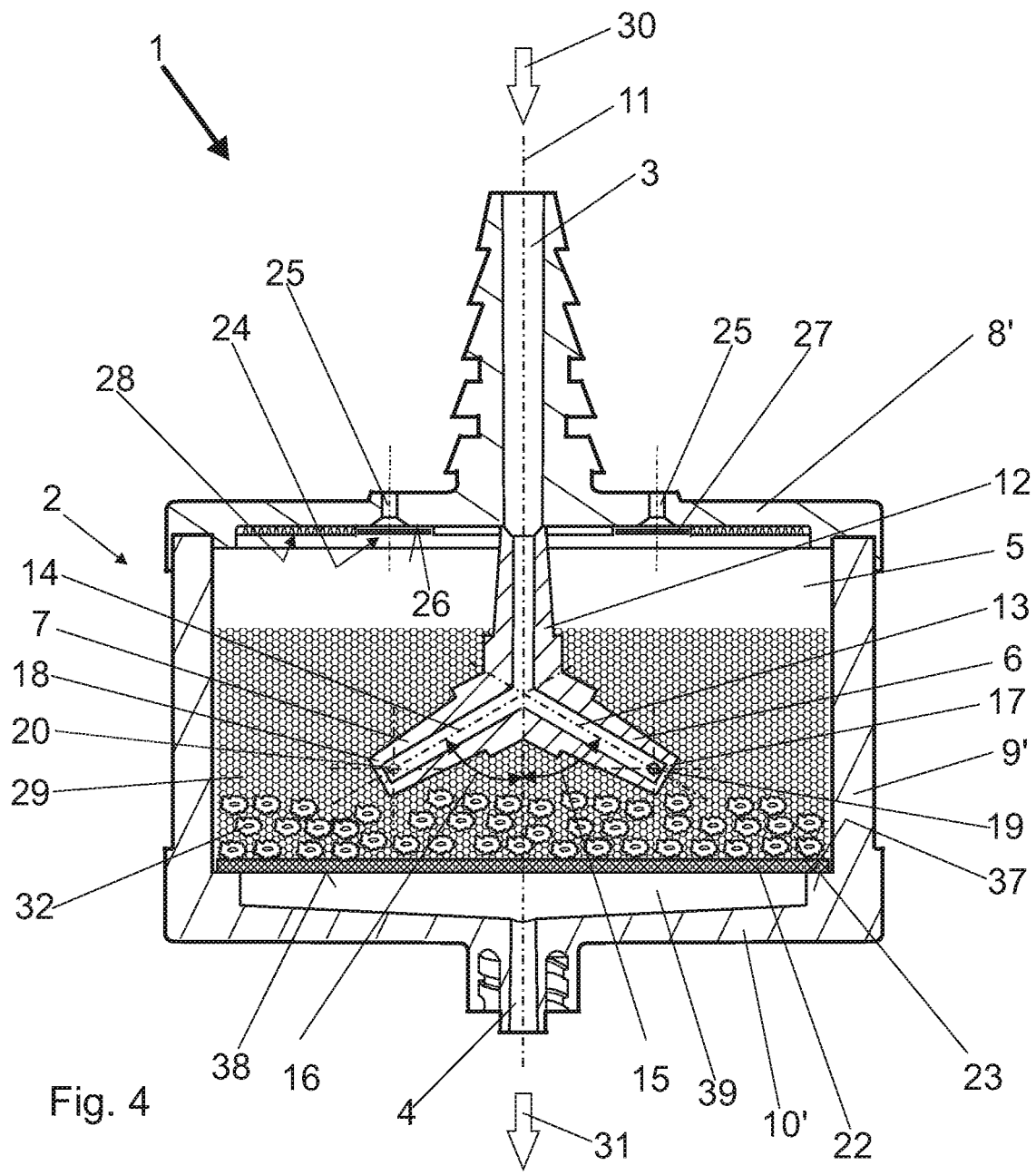
FIG. 4 shows a sectional side view of a media filtration apparatus according to a second exemplary embodiment.
Figure 5:
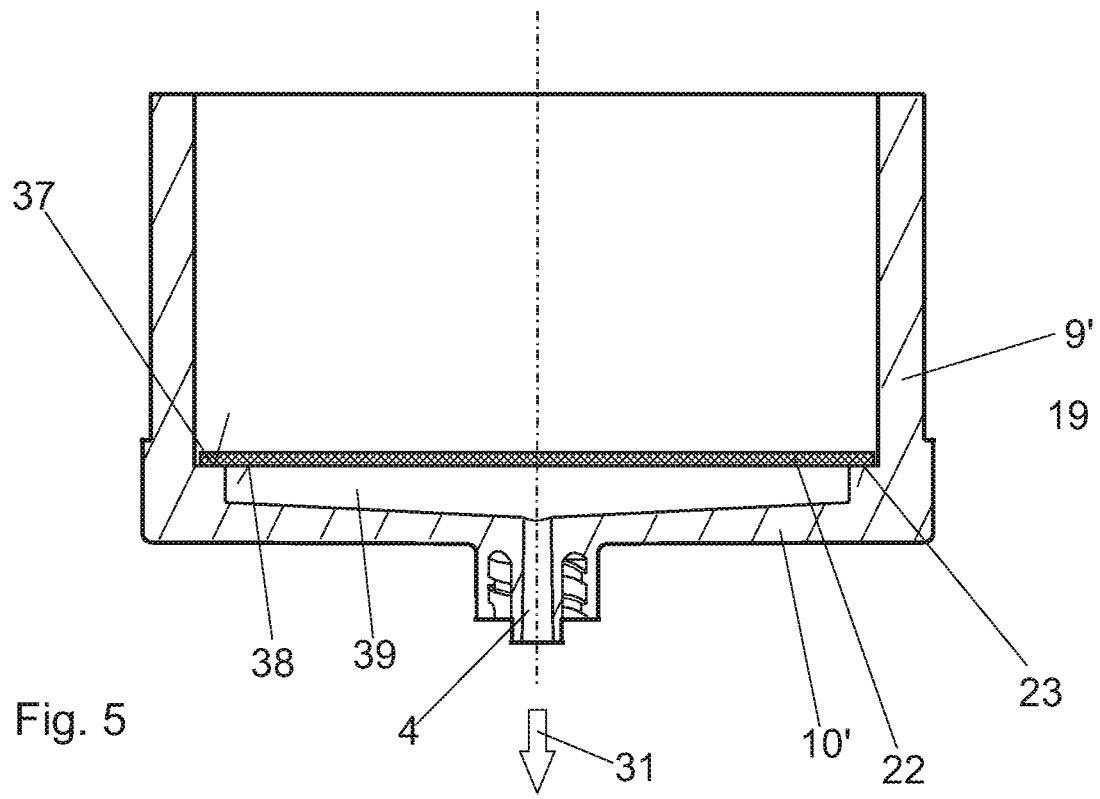
FIG. 5 shows the base part in FIG. 4 with filter and sterilized filtrate space.

According to FIGS. 4 and 5, the annular container wall 9' is integrally formed on the base part 10'. The container wall 9' is, at its upper end in the vertical direction, connected to a cover part 8', which has the inflow 3. The cover part 8', the container wall 9' and the base part 10' border the preparation chamber 5.

The inflow 3 projects with a carrier piece 12 into the preparation chamber 5 centrally with respect to the longitudinal axis 11 of the preparation container 2. At the end of the carrier piece 12, the carrier piece 12 transitions into the mixing arms 6, 7. The first mixing arm has a first mixing arm axis 13, and the second mixing arm 7 has a second mixing arm axis 14. The mixing arm axes 13, 14 are each spread away by a spreading angle 15, 16 in relation to the longitudinal axis 11, the latter simultaneously forming the longitudinal axis of the central carrier piece 12. The spreading angle 15, 16 should expediently be between 15° and 90°. In the exemplary embodiments, for both mixing arm axes 13, 14, the spreading angle 15, 16 is in each case 60°. At their free ends 17, 18, the mixing arms 6, 7 each have a lateral mixing nozzle 19, 20. Here, the mixing arms 6, 7 span a vertical plane with respect to which the mixing nozzles 19, 20 are oriented orthogonally and in opposite spraying directions.

The base part 10, 10' has toward the preparation chamber 5 a channel system 21 which conducts to the outflow 4 and which is covered by a filter 22. The filter 22, which is in the form of a sterile filter, is carried by the base part 10, 10' with the channel system 21, wherein the filter 22 has on its filtrate side 38, which faces the outflow 4, an encircling outer boundary 23, by way of which the filter bears on an encircling support boundary 37 of the base part 10, 10' of the preparation container 2 and is connected fixedly thereto.

A sterilized filtrate space 39 is formed between the filtrate side 38 of the filter 22 and the outflow 4 arranged in the base part 10, 10' by sterilization of the base part 10, 10' with the filter 22. Filtrate exiting the filter 22 is consequently fed as a solution 31 to the outflow 4 via the channel system 21, with the sterility of the solution 31 being ensured.

The cover part 8, 8' has a venting apparatus 24, whose venting openings 25 are covered by a hydrophobic filter 27, which is annular in the exemplary embodiments, on the inner surface 26, facing the preparation chamber 5, of the cover part 8, 8'. The cover part 8, 8' has concentrically with respect to the hydrophobic filter 27 an open channel system 28, via which air to be discharged from the preparation chamber 5 is conducted to the hydrophobic filter 27.

In the preparation chamber 5, there is arranged a medium 29 which is dissolved by a solvent 30 to be fed via the inflow 3 and is discharged as a solution 31 via the outflow 4. Agitation granules 32 which are not able to be dissolved by the solvent 30 are arranged in the preparation chamber 5.

For the purpose of media filtration, the inflow 3 of the media filtration apparatus 1 is connected to a storage container 33 from which the solvent 30 is fed to the preparation container 2 via a regulating valve 34 which is controlled by a control unit 35. The outflow 4 of the media filtration apparatus 1 is connected to a receiving container 36 to which the filtered solution 31 is fed.

The storage container 33 is also to be understood as meaning a fluid preparation system and, if the fluid (solvent 30) is water, also a water preparation system for analytically pure water, such as is marketed for example by Sartorius AG in Gottingen, Germany under the name Arium®.

For advance make-up of the media filtration apparatus 1, the cover part 8, 8' and the base part 10, 10', with the fixedly arranged filter 22, may be delivered loosely plugged together, for example sterile-packed. That is to say, at least the base part 10, 10' with filter 22 and the filtrate space 39 have to be sterile or sterilized.

The cover part 8, 8' (if in a plugged-together state) is lifted off from the base part 10, 10' with the sterilized filtrate space 39, and the medium 29 to be dissolved and possibly the agitation granules 32 are introduced into the preparation chamber 5.

Subsequently, the cover part 8, 8' is remounted on the base part 10, 10' and joined together therewith. The cover part 8, 8' and the base part 10, 10' may be joined together for example by laser welding, ultrasound welding or by adhesive bonding.

The embodiments discussed in the specific description and shown in the figures represent merely illustrative exemplary embodiments of the present invention. In the light of the disclosure here, a person skilled in the art is offered a broad spectrum of possible variants. The features of preferred embodiments are also able to be combined with one another without departing from the overall scope of the invention.

Figure 6:
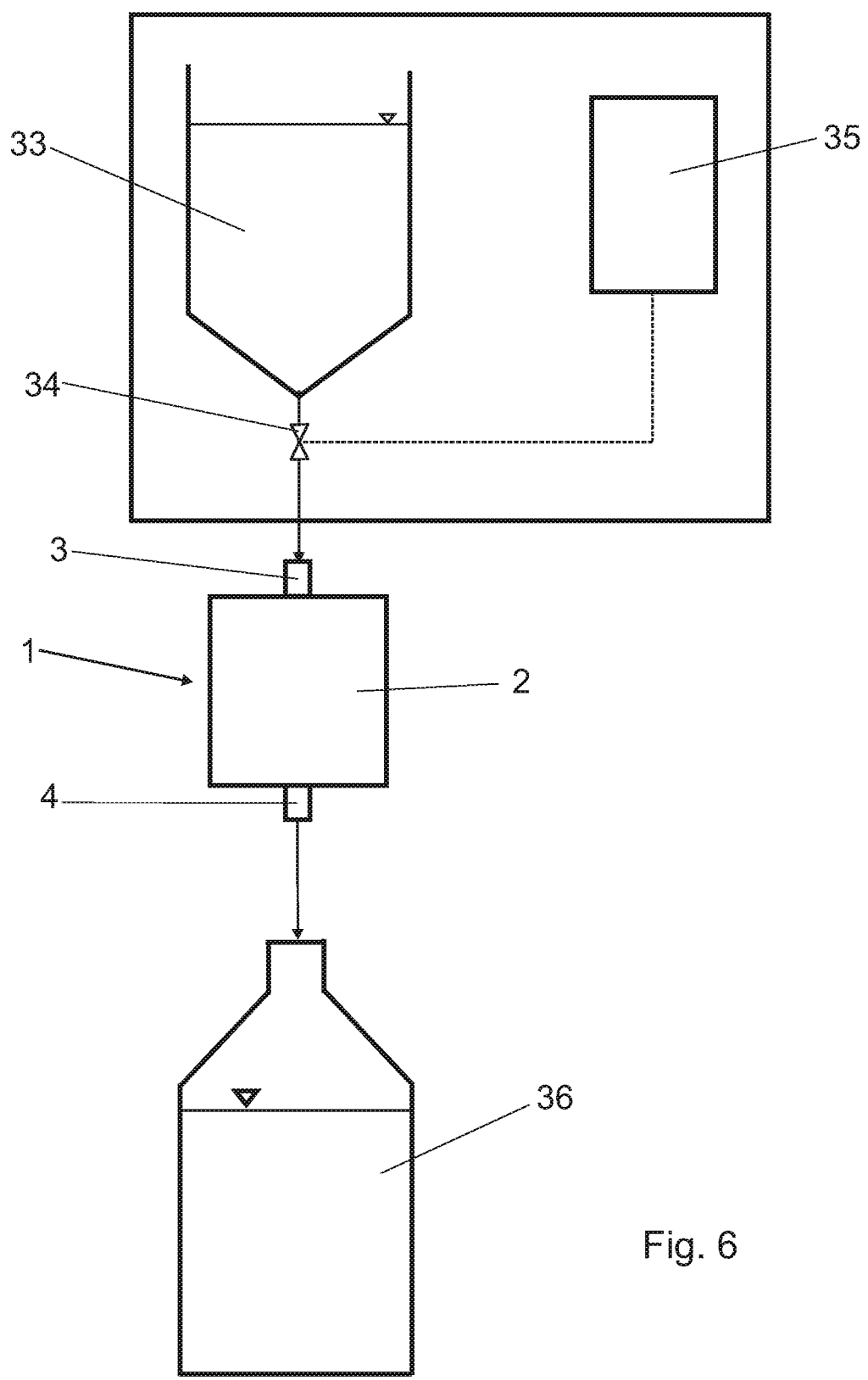
FIG. 6 shows a schematic illustration of a media filtration apparatus with an upstream controlled solvent container and a downstream collecting vessel for the filtered solution.
Figure 6A:
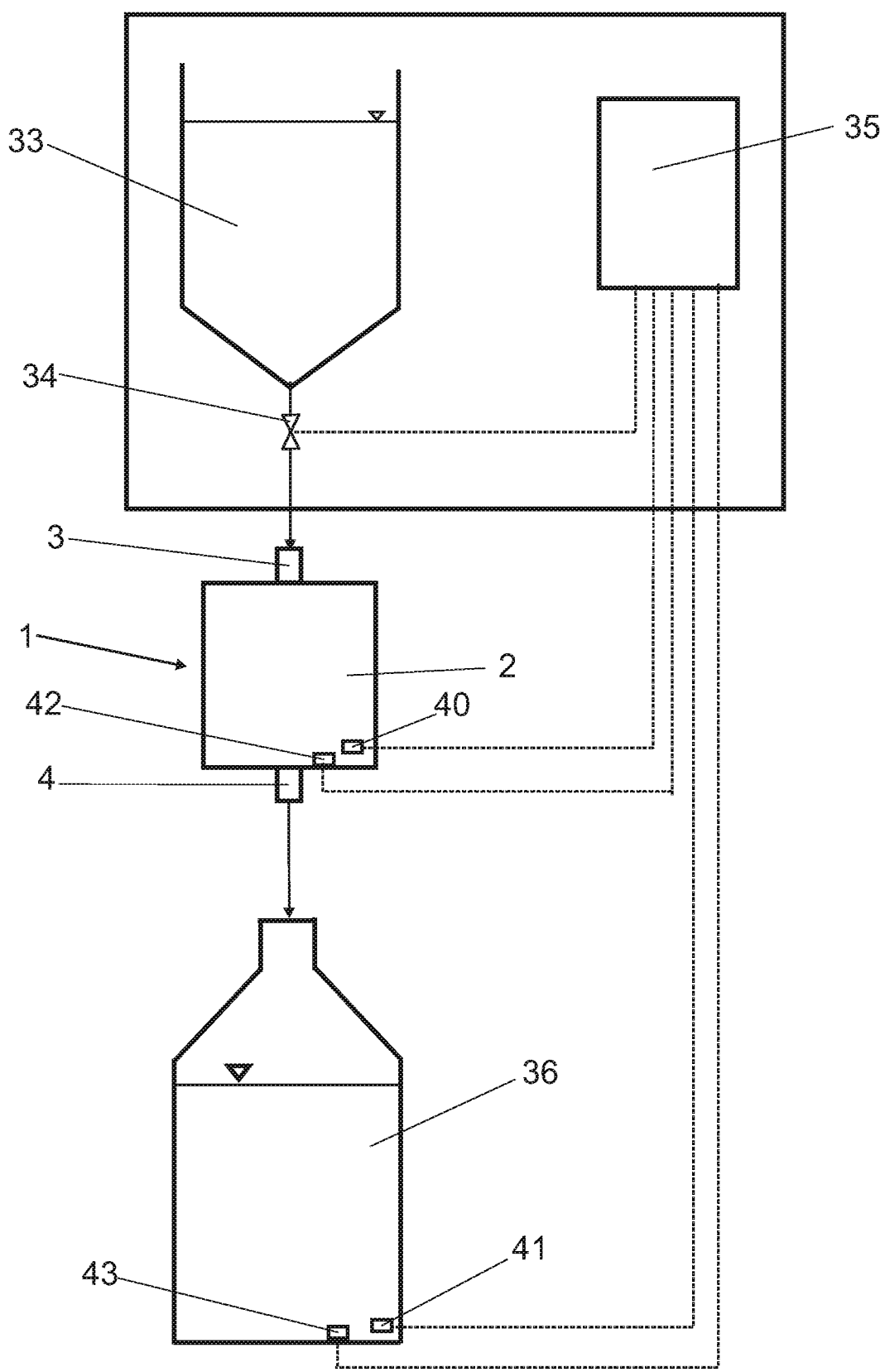
FIG. 6A shows a further schematic illustration of a media filtration apparatus as per FIG. 6.

In particular, in a further preferred embodiment of the invention as shown in FIG. 6A, the preparation container 2 and/or the receiving container 36 may have at least one sensor 40, 41 for determining a parameter of the prepared solution 31. Here, it is possible for the pH, the temperature, the conductivity or other parameters to be measured, and possibly to be regulated via the control and monitoring unit 35. It is also possible for a biochip 42, 43, for example for determining sterility, to be arranged in the preparation container 2 and/or receiving container 36.

The sensor 40 can monitor the complete transfer of the medium to be dissolved 29 via the sterile filter 22. Here, the sensor 40 may be arranged in the non-sterile preparation chamber 5 and communicate with the control unit 35. In conjunction with the control unit 35, the sensor 40 may track the conductivity in the preparation chamber 2 and, by falling-below a given threshold value, confirm the complete transfer of the medium 29.

LIST OF REFERENCE SIGNS

1 Media filtration apparatus
2 Preparation container
3 Inflow
4 Outflow
5 Preparation chamber
6 (First) mixing arm
7 (Second) mixing arm
8, 8' Cover part of 2
9, 9' Container wall
10, 10' Base part of 2
11 Longitudinal axis of 2
12 Carrier piece of 3
13 Mixing arm axis of 6
14 Mixing arm axis of 7
15 Spreading angle of 13
16 Spreading angle of 14
17 Free end of 6
18 Free end of 7
19 Mixing nozzle of 6
20 Mixing nozzle of 7
21 Channel system of 10
22 Filter
23 Outer boundary of 22
24 Venting apparatus of 8
25 Venting opening of 24
26 Inner surface of 8
27 Hydrophobic filter
28 Channel system of 8
29 Medium
30 Solvent
31 Solution
32 Agitation granules
33 Storage container
34 Regulating valve
35 Control unit
36 Receiving container
37 Support boundary of 10, 10'
38 Filtrate side of 22
39 Filtrate space
40 Sensor
41 Sensor
42 Biochip 43 Biochip

What is claimed is:

1. A media filtration apparatus having a prefabricated preparation container, comprising:
an inflow for a solvent and has an outflow for a solution,
a preparation chamber configured for a medium to be dissolved and arranged between the inflow and the outflow,
a filter that has a filtrate side facing the outflow, and
at least one mixing arm which is connected to the inflow, projects with at least one mixing nozzle arranged at a free end of the at least one mixing arm and is configured to direct a solvent jet into the medium to be dissolved in the preparation chamber, and
a cover part and a base part with an encircling support boundary,
wherein the preparation chamber is arranged between the cover part and the base part, wherein the filter is a sterile filter,
wherein the filter has, on the filtrate side, an encircling outer boundary, with which the filter bears on and is fixedly connected to the encircling support boundary of the base part, and
wherein the filtrate side of the filter and the outflow arranged in the base part form a sterilized filtrate space therebetween.

2. The media filtration apparatus as claimed in claim 1, further comprising agitation granules which are configured not to be dissolved by the solvent and are arranged in the preparation chamber.

3. The media filtration apparatus as claimed in claim 1, wherein the at least one mixing nozzle is arranged in the preparation chamber to direct the solvent jet to move the medium to be dissolved in a circular flow over the filter.

4. The media filtration apparatus as claimed in claim 1, wherein the base part has a channel system which conducts the solution to the outflow and which is open toward the filtrate side of the filter.

5. The media filtration apparatus as claimed in claim 1, wherein the preparation container further comprises a venting apparatus having at least one venting opening covered by a hydrophobic filter.

6. The media filtration apparatus as claimed in claim 5, wherein the inflow is arranged on the cover part of the preparation container, and
wherein the cover part comprises the venting apparatus, and the at least one venting opening is covered by the hydrophobic filter on an inner surface, facing the preparation chamber, of the cover part.

7. The media filtration apparatus as claimed in claim 6, wherein the cover part has an open channel system, via which air to be discharged from the preparation chamber is conducted to the hydrophobic filter.

8. The media filtration apparatus as claimed in claim 1, wherein the filter is a multi-ply filter.

9. The media filtration apparatus as claimed in claim 1, wherein the filter comprises at least one ply of a filter nonwoven.

10. The media filtration apparatus as claimed in claim 1, wherein the at least one mixing arm is two mixing arms connected to the inflow, wherein the two mixing arms each have at least one respective mixing nozzle arranged at respective free ends of the mixing arms within the preparation chamber.

11. The media filtration apparatus as claimed in claim 10, wherein the mixing nozzles are arranged eccentrically with respect to a longitudinal axis of the preparation container.

12. The media filtration apparatus as claimed in claim 10, wherein the inflow projects into the preparation chamber centrally with respect to a longitudinal axis of the preparation container and transitions into the mixing arms, which each spread away along respective mixing arm axes by spreading angles of between 15° and 90° in relation to the longitudinal axis.

13. The media filtration apparatus as claimed in claim 12, wherein the mixing arms span a vertical plane with respect to which the mixing nozzles are oriented orthogonally and in mutually opposing spraying directions.

14. The media filtration apparatus as claimed in claim 1, wherein the at least one mixing nozzle is arranged eccentrically with respect to a longitudinal axis of the preparation container.

15. The media filtration apparatus as claimed in claim 14, wherein the inflow projects into the preparation chamber centrally with respect to a longitudinal axis of the preparation container and transitions into the at least one mixing arm, which spreads away along a mixing arm axis by a spreading angle of between 15° and 90° in relation to the longitudinal axis.

16. The media filtration apparatus as claimed in claim 1, wherein the medium to be dissolved is a powder or granules.

17. A method for media filtration, comprising:
providing a media filtration apparatus as claimed in claim 1,
connecting the inflow of the media filtration apparatus to a storage container,
feeding the solvent from the storage container to the preparation container via a regulating valve which is controlled by a control unit, and
connecting the outflow of the media filtration apparatus to a receiving container, and
feeding the filtered solution to the receiving container.

18. A method, comprising:
prefabricating a preparation container, wherein prefabrication of the preparation container comprises:
a) providing a media filtration apparatus as claimed in claim 1 as the preparation container,
b) providing the cover part and the base part with the sterilized filtrate space,
c) introducing the medium to be dissolved into the preparation chamber, and
d) joining together the cover part and the base part.

19. The method as claimed in claim 18,
wherein the step c) comprises: additionally introducing agitation granules, which are configured not to be dissolved by the solvent, into the preparation chamber.

* * * * *